Jan. 18, 1966 L. A. LA VINE 3,230,096
METHOD OF REVITALIZING FOODSTUFF
Filed Feb. 14, 1964
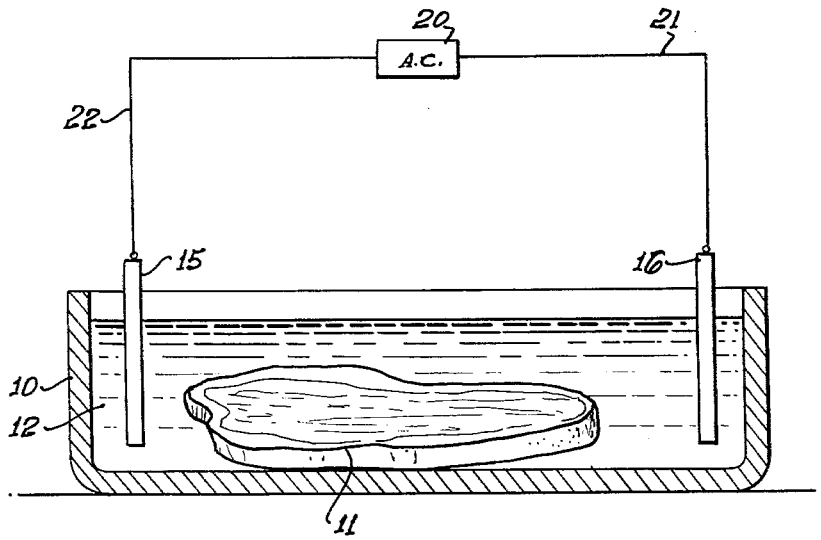
LOUIS A. LAVINE,
INVENTOR.
BY HIS ATTORNEYS.
Spensley & Horn.

United States Patent Office 3,230,096
Patented Jan. 18, 1966

3,230,096
METHOD OF REVITALIZING FOODSTUFF
Louis A. La Vine, 159 S. Western Ave.,
Los Angeles 4, Calif.
Filed Feb. 14, 1964, Ser. No. 346,371
6 Claims. (Cl. 99—233)

This application is a continuation-in-part of my copending continuation-in-part application Serial No. 64,780, entitled "Sanitary Food Preparations and Methods of Preparing Same," filed October 25, 1960, now abandoned.

This invention relates to the revitalization and treatment of food, and more particularly to a new and improved method for revitalizing foodstuffs.

The present invention is specifically directed toward the revitalization of foodstuffs. The term "foodstuffs," as utilized in this specification and the following claims, refers to that group of comestibles comprising meat, fruit, vegetable, fish, fowl, and dairy products, the term "fruit" being used in its generic sense as pertaining to any product of vegetable growth useful to man as a comestible.

The present invention is also directed toward the treatment of foodstuffs by prevention of oxidation and enzymatic action, simultaneously accomplished during the revitalization process.

It is therefore an object of the present invention to provide an improved method for revitalizing foodstuffs.

A further object of the present invention is to provide a method for revitalizing and treating foodstuffs by preventing oxidation and enzymatic action.

The objects of the present invention are accomplished by immersing the foodstuff to be treated in an aqueous solution of a nontoxic calcium polysulfide compound through which an electrical current is passed, the foodstuff being disposed within the magnetic flux created in the aqueous solution by the flow of electrical current. The immersed foodstuff is maintained within the field of the magnetic flux for a time sufficient to effect revitalization as indicated by regained color and fresh appearance.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing there is shown an exemplary apparatus for carrying out the present invention method.

It is known that sulphur is necessary for proper functioning of the human body. Scientists have discovered that sulphur is important not only in connection with hair, nails, skin, etc., but also with glandular secretions and vital organs. For example, sulphur must be present in the bile for proper digestion of fats; its presence in insulin from the pancreas is necessary for the metabolism of starches and sugars, etc. It is readily apparent that sulphur supplied to the human body must be assimilable and nontoxic. Now the element sulphur is of a crystalline structure, and appears in two different crystal types, namely, alpha-rhombic sulphur and beta-monoclinic sulphur. Sulphur is commercially used mostly in its crystalline form, and sulphur in its crystalline form is toxic and an irritant. However, scientific research has proven that sulphur in a colloidal form is assimilable by the human body and is nontoxic. Certain forms of colloidal sulphur have been recognized as assimilable and nontoxic, among them being the calcium polysulfide compound disclosed in my U.S. Patent No. 2,528,008, issued October 31, 1960, and entitled "Food Products and Method of Making Same," which is the particular compound utilized in the present invention process. The present invention solution is prepared by adding a predetermined amount of nontoxic calcium polysulfide to water. The resulting aqueous solution can be advantageously admixed with certain oils, the water being blended with the oils.

The present invention solution may be advantageously prepared as follows: One part by weight of nontoxic calcium sulfide is admixed with two parts by weight of powdered sulphur. Sufficient water is added to form a heavy suspension, which is calcium polysulfide. The mixture should then preferably be boiled until no further evidence of suspension is observable. Any remaining crystalloidal sulphur may then be removed by filtration while the solution is heated. The resulting concentrate containing sulphur only in colloidal form is added to water (preferably distilled) to produce an approximate 5% solution by weight, this solution being hereinafter designated the concentrated solution.

This concentrated solution of nontoxic calcium polysulfide can be added to water (preferably distilled) in an amount of 5 to 15 drops per gallon to thereby form a dliute solution. Alternatively, concentrated U.S.P. nontoxic calcium polysulfide may directly be added to water in the same amount, i.e., 5 to 15 drops per gallon to form the dilute solution.

In preparing the dilute water solution of calcium polysulfide in accordance with this invention, it primarily was indicated that from 5 to 15 drops of the concentrated solution per gallon of water is used. One can easily determine the amount described within this range, which amount will vary as a function of the hardness of the water. Enough should be added to the water to cause a milky consistency.

Through clinical research I have discovered that assimilable nontoxic, colloidal sulphur, particularly in the form of nontoxic calcium polysulfide, exerts a detoxifying action. In the concentrated form it can be taken orally alone, in a food, or in beverages such as water, milk, fruit juices, tea or coffee, or other liquids. When added to a beverage, approximately one to ten drops per glass is preferred.

This nontoxic calcium polysulfide is used in the present invention as an electrolyte in the revitalization of foodstuffs, the resulting chemical action upon passage of electrical current therethrough, in combination with the resulting magnetic flux, causing the chemical combination of atoms and molecules of the calcium polysulfide into the structure of the foodstuff undergoing treatment. Sulphur in crystalline form, in addition to being toxic and an irritant, is a good insulator and will not provide electrolytic action. However, the nontoxic colloidal form of sulphur used in the present invention process is an electrical conductor and so will provide the desired electrolytic action. It is believed that cataphoretic movement of ions and other particles within the electromagnetic field stimulate enzymes in the cells of the foodstuff being treated, which enhances recombination of the atoms and molecules of the foodstuff together with the sulphur to achieve revitalization of the foodstuff.

Modern scientific research is gradually discovering more about chemical changes in plant and living structures resulting from the application of electricity. There has recently been stated an "electron flow" theory in which the flow of electrons results in transference of light energy into chemical energy to provide the initial steps in photosynthesis, which results in chemical changes in the plant structure. Research is being conducted concerning the synthesis of a molecule which causes chemical reactions in living systems, the synthesis being by electron bombardment. It has also been found that an electric field can exert a controlling effect on bacteria, the flux apparently causing the observed changes. Although in the scientific laboratory the flux can be readily created by radiation, electron bombardment, etc., it is presently preferred to create the flux in a much simpler and readily available manner, i.e., from a source of electrical current.

The electrical excitation can be from a source of alternating current or direct current, and may range from a few volts to several hundred volts. It is presently preferred to utilize the readily available 110-volt A.C. house current, both as a matter of convenience and to take advantage of the periodical reversal of the direction of current flow which tends to prevent undue neutralization of ionic charges. The treatment time is readily determinable since upon beneficial action of the sulphur solution the physical appearance of the foodstuff will change. For example, the leaves of leafy vegetables become crisp and more colorful and all foods become more attractive and fresh in appearance. The treatment time depends primarily upon the nature and condition of the particular foodstuff being treated, some foods responding in a few minutes while other foods may require several hours of treatment to accomplish the revitalization. However, as indicated hereinabove, the immersion time is readily determinable by visual observance of the foodstuff being treated.

The calcium polysulfide solution need not be maintained within any particular temperature range, although it is presently preferred to maintain the solution within a temperature range of from about 15° to 30° C. This stated temperature range is presently preferred primarily for convenience and also for the obvious reasons that the use of significantly higher temperatures could cause cooking of the food being treated as well as increased vaporization of the treating solution.

An exemplary apparatus for carrying out the above described method in accordance with this invention is shown in the drawing. Into a container 10 there is placed the foodstuff 11 to be treated, meat being illustrated. A quantity of the aforementioned dilute, nontoxic calcium polysulfide solution 12, is then added to completely cover the foodstuff. Electrodes 15 and 16 are placed within the solution near opposed ends of the container. The electrodes 15 and 16 are connected to a source of alternating current 20 by means of electrical leads 21 and 22. Energization of the A.C. source 20 begins the revitalization treatment, the treatment time being determined by visual observation, as indicated hereinabove. During treatment, hydrogen sulfide gas will be evolved, thereby indicating that a chemical change is taking place.

The increase in vitality of the foodstuff being treated is readily apparent, leafy vegetables such as spinach, lettuce and cabbage becoming crisp and fresh looking. Wilted leaves seem to reactivate, the cells appearing to be recharged. Celery, potatoes and other root vegetables such as carrots, turnips and beets regain much of their original texture, color and appearance. Fruit reacts in much the same manner as do vegetables, and pulpy fruits regain firmness.

Treatment of foodstuffs by the present invention process, in addition to revitalizing the foodstuff, also increases the sulphur content of the foodstuff. For example, during the revitalization of lettuce by the present invention method the sulphur content of the lettuce leaves can typically be increased tenfold. More important however is the decrease in pH afforded by the present invention treatment. For example, in a typical treatment of lettuce leaves the addition of 10 drops of dilute, nontoxic calcium polysulfide solution to 750 ml. of distilled water raised the pH from 5.2 to 8.0. Upon treatment for two hours utilizing a 110-volt A.C. electrical supply the pH had dropped to 6.3, this final pH value being significantly lower than that obtainable under similar circumstances only without electrical excitation. This increase in solution hydrogen ion concentration indicates a reversal of the decomposition process and a chemical change of revitalizing effect.

I have further discovered that in accordance with the process wherein the food is revitalized by immersion in a dilute water solution of calcium polysufide excited by an electrical source that it may be desirable, although not necessary, to add to the water and blend therewith edible oils such as nut oils or fish oils. The blending of the oils with the water solution of the calcium polysulfide is best effected by agitation together with the application of the exciting electrically produced magnetic flux field although the electrical excitation is not necessary in order to produce the desired blending, semiagitation alone being satisfactory. The amount of oil to be added should be as follows: One part of water to preferably 10 parts of oil although this may be varied to one part of water to from 8 to 12 parts of oil. The presence of the calcium polysulfide stabilizes the water-oil emulsion to thereby prevent water damage of the foodstuffs being treated.

The phrase "nontoxic calcium polysulfide compound," as utilized herein, is limited to a composition that when diluted liberates colloidal sulphur and forms calcium hydrosulfide without harmful effects to consumers of the food so treated.

My invention may be embodied in other specific forms without departing from the spirit or essential characteristics thereof. The present embodiment as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What is claimed is:

1. A method of revitalizing a decomposing foodstuff selected from the group consisting of meat, fruit, vegetable, fish, fowl and dairy products comprising: immersing the foodstuff in an aqueous solution of nontoxic calcium polysulfide; and passing an electrical current through said aqueous solution to thereby create a magnetic flux therein, said foodstuff being disposed within the field of said magnetic flux for a time sufficient to reverse the decomposition process and effect revitalization of said foodstuff as indicated by regained color and fresh appearance.

2. A method of revitalizing a decomposing foodstuff selected from the group consisting of meat, fruit, vegetable, fish, fowl and dairy products comprising: immersing the foodstuff in an aqueous solution containing nontoxic calcium polysulfide in an amount equivalent to about five to fifteen drops of 5% by weight nontoxic calcium polysulfide per gallon of water; and passing an electrical current through said aqueous solution to thereby create a magnetic flux therein, said foodstuff being disposed within the field of said magnetic flux for a time sufficient to reverse the decomposition process and effect revitalization of said foodstuff as indicated by regained color and fresh appearance.

3. A method of revitalizing a decomposing foodstuff selected from the group consisting of meat, fruit, vegetable, fish, fowl and dairy products comprising: immersing the foodstuff in an aqueous solution containing from about 5 to 15 drops of concentrated nontoxic calcium polysulfide per gallon of water, said container having first and second electrodes respectively disposed at opposite ends thereof and partially immersed in said solution; and connecting a source of electricity between said first and second electrodes to thereby cause passage of an electrical current through said aqueous solution and the creation of a magnetic flux therein, said foodstuff being disposed between said first and second electrodes and within the field of said magnetic flux for a time sufficient to reverse the decomposition process and effect revitalization of said foodstuff as indicated by regained color and fresh appearance.

4. A method of revitalizing a decomposing foodstuff selected from the group consisting of meat, fruit, vegetable, fish, fowl and dairy products comprising: immersing the foodstuff in an aqueous solution containing from about 5 to 15 drops of concentrated nontoxic calcium polysulfide per gallon of water, said aqueous solution being held within a container, said container having first and second electrodes respectively disposed at opposite ends thereof and partially immersed in said solution; and connecting a source of alternating current electricity between said first and second electrodes to thereby cause passage of an electrical current through said aqueous solution and the creation of a magnetic flux therein, said foodstuff being disposed between said first and second electrodes and within the field of said magnetic flux for a time sufficient to reverse the decomposition process and effect revitalization of said foodstuff as indicated by regained color and fresh appearance, said source of alternating current electricity providing from about 110 to 440 volts at a frequency of from about 25 to 65 cycles per second.

5. A method of revitalizing a decomposing foodstuff selected from the group consisting of meat, fruit, vegetable, fish, fowl and dairy products comprising: immersing the foodstuff in an emulsion comprising one part of water per 8 to 12 parts of edible oil and about 5 to 15 drops of a 5% by weight solution of nontoxic calcium polysulfide per gallon of water; and passing an electrical current through said emulsion to thereby create a magnetic flux therein, said foodstuff being disposed within the field of said magnetic flux for a time sufficient to reverse the decomposition process and effect revitalization of said foodstuff as indicated by regained color and fresh appearance.

6. A method of revitalizing a decomposing foodstuff selected from the group consisting of meat, fruit, vegetable, fish, fowl and dairy products comprising: immersing the foodstuff in an emulsion comprising one part of water per 8 to 12 parts of edible oil and about 5 to 15 drops of a 5% by weight solution of nontoxic calcium polysulfide per gallon of water, said emulsion being held within a container, said conatiner having first and second spaced apart electrodes disposed therein and partially immersed in said emulsion; and connecting a source of electrical current between said first and second electrodes to thereby cause passage of an electrical current through said emulsion and the creation of a magnetic flux therein, said foodstuff being disposed between said first and second electrodes and within the field of said magnetic flux for a time sufficient to reverse the decomposition process and effect revitalization of said foodstuff as indicated by regained color and fresh appearance.

References Cited by the Examiner
UNITED STATES PATENTS

| | | | |
|---|---|---|---|
| 267,684 | 11/1882 | Fowler | 99—233 |
| 760,173 | 5/1904 | Ball | 99—233 |
| 1,828,518 | 10/1931 | Wysong | 99—233 |
| 2,219,772 | 10/1940 | Gernhardt | 99—233 |
| 2,528,008 | 10/1950 | La Vine | 99—229 X |

A. LOUIS MONACELL, *Primary Examiner.*

R. S. AULL, *Assistant Examiner.*